Sept. 20, 1932.   O. H. HARTMANN ET AL   1,878,514
COMBINED STEAM GENERATOR AND FEED WATER PREHEATER AND PURIFIER
Filed Feb. 17, 1931   2 Sheets-Sheet 1

Inventors
OTTO H. HARTMANN
and HANS TREDE
By Their Attorney

Inventors
OTTO H. HARTMANN
and HANS TREDE
By Their Attorney

Patented Sept. 20, 1932

1,878,514

UNITED STATES PATENT OFFICE

OTTO H. HARTMANN, OF KASSEL-WILHELMSHOHE, AND HANS TREDE, OF KASSEL, GERMANY, ASSIGNORS TO SCHMIDT'SCHE HEISSDAMPF-GESELLSCHAFT MIT BESCHRANKTER HAFTUNG, OF KASSEL-WILHELMSHOHE, GERMANY, A CORPORATION OF GERMANY

COMBINED STEAM GENERATOR AND FEED WATER PREHEATER AND PURIFIER

Application filed February 17, 1931, Serial No. 516,522, and in Germany February 28, 1930.

This invention relates to an apparatus for preheating and purifying boiler feed water and concerns itself particularly with one in which the incoming feed water is caused to flow and drip over a suitable flow surface or surfaces arranged in the steam space of the boiler drum. In order to obtain the desired degree of purification and preheating in a device of this type, the flow surfaces which are laved by the incoming water are necessarily of considerable area so that great difficulties have been experienced in effecting their insertion and removal from the boiler drum. A general object of the present invention is the provision of a purifier and preheater of this type which is so constructed that it is capable of being handled with ease and dispatch so that its insertion and removal from the drum will be greatly facilitated.

In the case of steam boilers whose drums have interior structures built therein the problem of handling flow and drip members within the drum becomes the more acute inasmuch as the interior structures restrict their movement. The drums of boilers in which steam is generated indirectly, for example, contain heating elements through which a heating medium circulates and which restrict the unobstructed space in the drum within which the flow surfaces of the purifier can be manipulated. Purifiers and preheaters constructed in accordance with this invention therefore find particularly favorable application in boiler drums having interior structures and an object of the invention is the provision of a construction enabling the insertion and removal of the flow member or members of the preheater and purifier from the drum without disturbing the interior structural elements.

It is not desirable to direct the incoming feed water directly over or upon the heating elements or similar interior structures within the drum and the invention therefore further contemplates an arrangement in which the water from the purifier and preheater is led to the water space at points removed from the main body of the interior structures.

An additional advantage contemplated is that of obtaining the desirable degree of preheating. This is provided for by substantially freely exposing the underside of the elements presenting the flow surface, to the steam generated from the water in the water space.

In carrying out the invention, the purifier flow and drip members are arranged longitudinally of the drum and comprise assemblies of independent units, each of which can be removed or inserted separately and conveniently. In one embodiment of the invention the independent unit constitutes sheet metal plates mounted on a frame in overlapping relation at progressively increasing elevations, there being a collection gutter with outlet openings at the lowest plate. These individual units are arranged and supported end to end longitudinally of the drum and in oblique position so that they present, when assembled into position to form the flow member, a composite terraced flow surface descending from the top of the drum at the center, downwardly towards a side, and which extends substantially continuously in longitudinal direction. The flow member may be arranged on either side of the drum, or if desired, provision may be made for assembling the units interchangeably on either side. A flow member may further be arranged on both sides if necessary. The collection gutters are adjacent the side walls of the drum so that the water from the terraced flow surface will be discharged at the side walls through the outlet openings in the gutters whereby the pouring of the water over the heating elements or other interior structures is avoided. The feed water is delivered to the individual units at their uppermost portions by means of a conduit having outlet openings facing the flow surface and steam is taken from the drum by means of a conduit at the upper part of the steam space at the side of the flow surface. The flow plates are preferably made of easily rusting metal.

The arrangement has the further advantage in that the entire heating surface is contacted by the water even when the drum changes its position, either longitudinally or transversely, as would occur for instance in a marine installation due to the rocking of the ship.

In the drawings, which are illustrative of the invention, Fig. 1 shows a vertical longitudinal section through the upper drum of a steam boiler having therein a purifier and preheater constructed in accordance with my invention;

Figure 1:
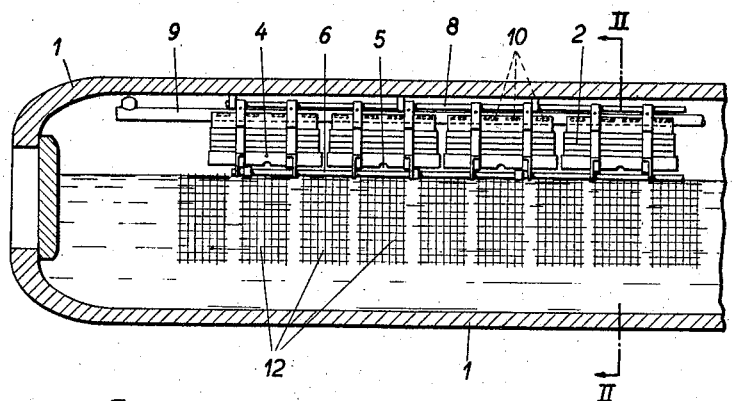
Figure 2:
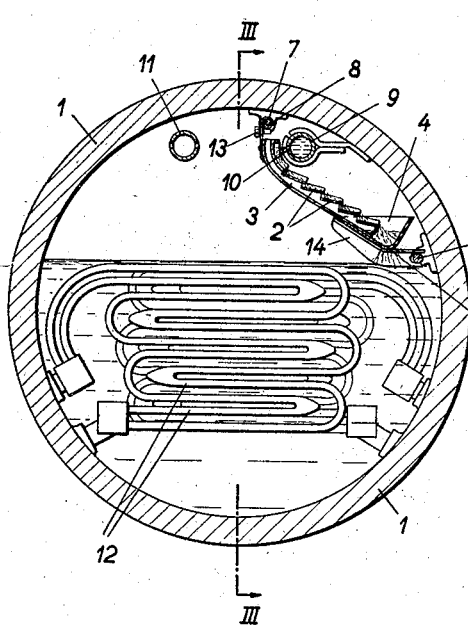
Fig. 2 is a cross section along line 2—2 of Fig. 1 but to a greater scale.
Figure 3:
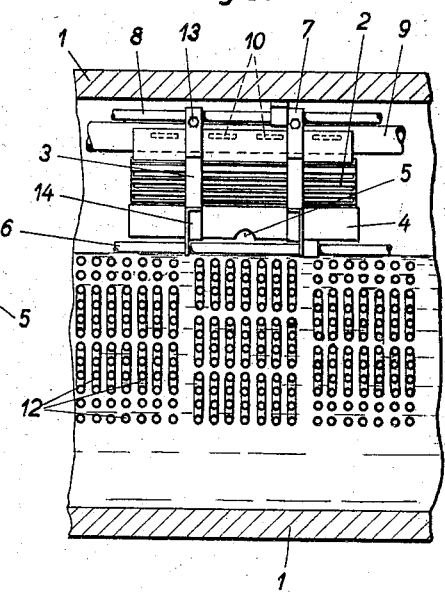
Fig. 3 is a cross section along the line 3—3 of Fig. 2.
Figure 5:
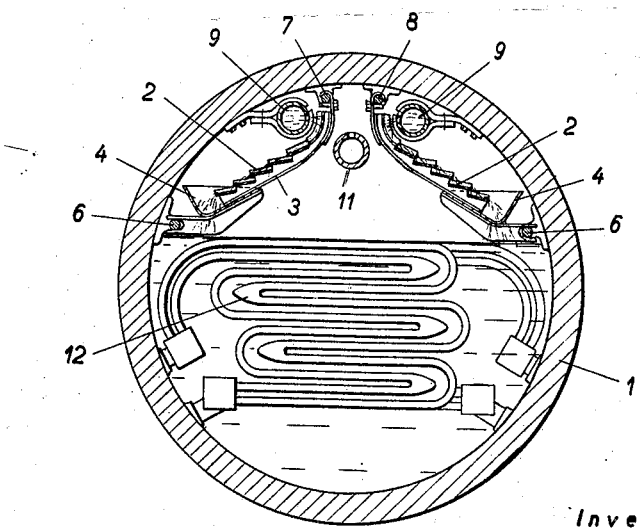

And Fig. 5 is a cross section corresponding to that shown in Fig. 2 but disclosing a somewhat modified arrangement.

Figure 4:
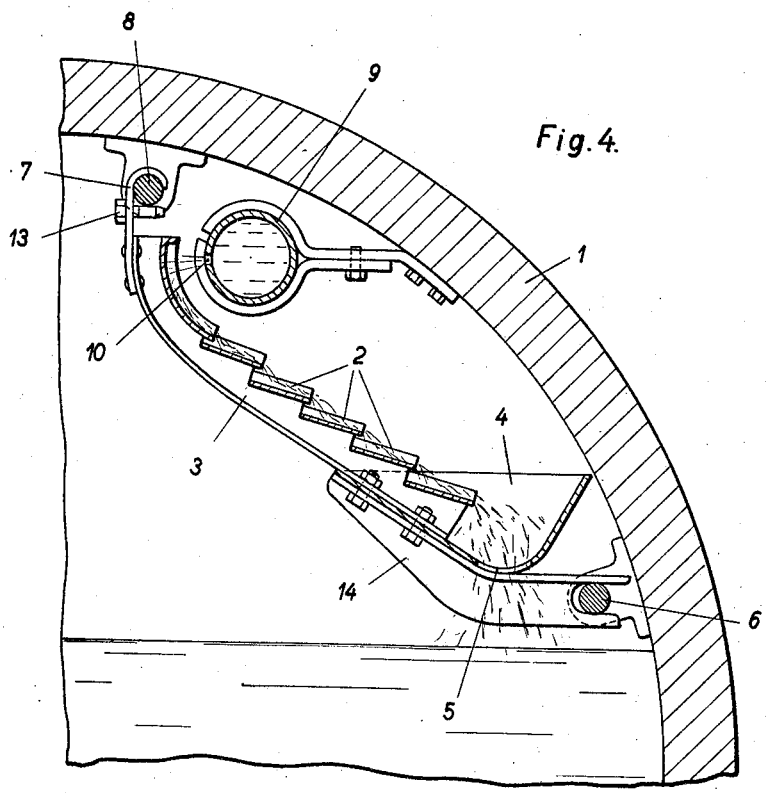
Fig. 4 is a detailed view on an enlarged scale of the structure appearing in the upper right hand portion of Fig. 2.

The flow member of the feed water purifier and preheater which is to be assembled in the upper drum 1 of a steam boiler as shown in Figs. 1 to 4 is made up of a plurality of individual units which are arranged longitudinally of the drum. Each of the units comprises a plurality of sheet metal flow plates 2 arranged in overlapping relation and secured to a frame 3 to form a terraced surface. Below the lowest plate 2 there is a collection gutter 4 provided with outlet openings 5 and positioned to catch the water flowing over the plates of the unit. The lower portion of the frame 3 is provided with arms 14, slotted at their ends as shown in detail in Fig. 4, and the upper portion of the frame is provided with hooks 7 as also shown in Fig. 4.

Secured to the walls of the drum in any convenient manner are a lower supporting rod 6 and an upper supporting rod 7. These rods 6 and 7 run longitudinally of the drum and are parallel. When assembled within the drum the individual units comprising the flow member are mounted on the rods 6 and 7 adjacent one another so that the plates 2 of adjacent units are positioned end to end and present a longitudinally continuous stepped flow surface. When a unit is to be attached to the supporting rods the slotted ends of the lower arms 14 are placed in engagement with the lower supporting rod 6 and the unit is then pivoted upwardly and raised slightly until the hooks 7 are brought over the supporting rod 8. The unit is then dropped to bring hooks 7 into engagement with rod 8. If it is desired to fix the unit more securely to the supporting rods a bolt 13 may be used to prevent unintentional displacement from rod 8.

The feed water is led to the flow surface through a conduit 9 provided with slotted discharge openings 10 facing the upper portion of the flow surface. In consequence the feed water is continuously and uniformly directed against the upper plates of the flow member and then drips down over the plates 2 into the collecting gutters 4, finally passing through the discharge openings 5 into the water space of the drum. If desired, discharge conduits leading to the bottom of the water space may be connected to the discharge openings 5. Due to the flowing and dripping of the water over the plates 2 it is highly preheated to temperatures dependent upon the dimensions of the contact surfaces. Moreover, such gases as the carbonic acid gases and oxygen are removed and carried with the steam to the point of use through the outlet conduit 11 arranged at the side of the purifier.

In the modification described above there is a flow member on only one side of the drum but in the modification disclosed in Fig. 5 there are flow members on both sides. Whether or not it is desirable to assemble a flow member on only one side or on both sides depends in general upon the size of the drum, that is upon the amount of available space. Where the drum is of relatively great length as compared to its diameter, a flow member arranged on a single side or a single flow member which is adapted to be shifted from right to left and vice versa is generally sufficient. Where the length is relatively small, however, it is advantageous to arrange a flow member on both sides of the drum. The structural details of the arrangement shown in Fig. 5 are the same as those shown in Figs. 1 to 4. Each flow member constitutes an assembly of units similar to that disclosed in Figs. 1 to 4. The steam is taken off by means of a conduit 11 arranged in the upper portion of the drum 1 between the two flow members. Each of the flow members is provided with a feed water conduit 9 having side openings for delivering the water to the plates constituting the flow surfaces.

In the examples shown in the drawings, the drum disclosed is one adapted for indirect steam generation by means of a heat carrier although the invention is not necessarily limited to drums of this type. Its principles can also be used advantageously in drums wherein steam is generated directly. The drum 1 contains heating elements 12 through which the heat carrier gives off its heat to the water which is to be converted into steam and the flow members are so arranged that their individual units may be inserted and removed over and above the heating elements 12. In assembling a flow member it is only necessary to insert the individual units through the manhole of the drum and move them over the heating elements 12 to the positions at which they are to be mounted upon the supporting rods. When opposite the point at which any particular unit is to be mounted, it is moved towards the side of the drum so that the slots in its lower arms 14 will engage the lower supporting rod 6. The element is then tilted upwardly about this rod and lifted slightly so that it can be hung over the upper supporting rod 8 by means of the hooks 7. The removal of the unit is of course accomplished in reverse order. After the bolt 13 has been removed and the unit is lifted sufficiently to enable the ends of the hooks 7 to clear the top of the rod 8, it is then pivoted about the lower rod 6 until it again rests on the upper side of the heating elements 12. The size of the individual units is a matter of selection but in general it has been found convenient to make them so small that they can easily be handled by two men.

The units are preferably constructed of material which rusts readily so that the oxygen present will combine with this material and not with the material of the remainder of the drum structure, for instance, the material of the heating elements 12 which might be harmed by corrosion.

As clearly shown in the drawings the discharge of the preheated and purifier water takes place at the sides adjacent the drum wall so that the water will not be poured over the heating element 12.

Having now described our invention, what we now claim as new and desire to secure by Letters Patent of the United States is as follows:

1. A feed water preheating and purifying apparatus disposed within the steam space of a drum in which steam is generated, comprising a flow member presenting a composite downwardly inclined flow surface and being constituted of a plurality of individual units each supported to present a portion of said composite flow surface, and means for directing feed water substantially uniformly against the upper portion of said composite flow surface, each of said individual units constituting a frame carrying metallic plates and detachably secured to the drum walls with its upper end near the top of the drum adjacent the median plane of the water body and with its lower end adjacent the water surface at the side of the drum, the upper surfaces of the metallic plates comprising portions of the composite flow surface and the lower surfaces of said plates being freely exposed to the steam generated from the water in the water space.

2. A feed water preheating and purifying apparatus disposed within the steam space of a drum in which steam is generated, comprising a flow member extending longitudinally of the drum and presenting a composite flow surface terraced in cross-section and inclining transversely of the drum from a longitudinal line of highest elevation near the top of the drum and adjacent the median plane of the water body to a longitudinal line of lowest elevation adjacent the water surface at a side of the drum, said flow member being constituted of a plurality of individual units each comprising a frame carrying a plurality of sheet metal plates arranged in overlapping stepped relation, said units being independently and removably secured side by side longitudinally of the drum so that the corresponding plates of adjacent units lie in substantially common planes to form the composite terrace surfaces running longitudinally of the drum, and means for directing feed water substantially uniformly against the upper plates of said units, whereby said water is preheated and purified by flowing downwardly over the sheet metal plates.

3. A feed water preheating and purifying apparatus disposed within the steam space of a drum in which steam is generated, comprising a flow member extending longitudinally of the drum and presenting a composite flow surface terraced in cross-section and inclining transversely of the drum from a longitudinal line of highest elevation near the top of the drum and adjacent the median plane of the water body to a longitudinal line of lowest elevation adjacent the water surface at the side of the drum, said flow member being constituted of a plurality of individual units each comprising a frame carrying a plurality of sheet metal plates arranged in overlapping stepped relation and carrying a collection gutter provided with an outlet opening at the lowest plate, said units being independently and removably secured side by side longitudinally of the drum so that the corresponding plates of adjacent units lie in substantially common planes to form the composite terrace surfaces running longitudinally of the drum, and means for directing feed water substantially uniformly against the upper plates of said units, whereby said water is preheated and purified by flowing downwardly over the sheet metal plates.

4. In a steam generating boiler drum having an interior structure mounted within its water space, a feed water preheating and purifying apparatus mounted within the steam space of the drum and comprising a flow member presenting a composite flow surface inclined in cross-section from a longitudinal line of highest elevation near the top of the drum and adjacent the vertical median plane of the water body to a longitudinal line of lowest elevation at a side wall of the drum adjacent the water surface, said flow member being constituted of a plurality of individual units arranged side by side longitudinally of the boiler drum each supported and arranged to present a portion of said flow surface having its lowest elevation at a side wall of the drum and each being readily and separately removable, and means for directing feed water substantially uniformly against the upper portion of said composite flow surface, whereby said feed water passes over said flow surface and is delivered to the water body along a line adjacent a side wall of the drum.

5. In a steam generating boiler drum having a heating element providing passage for a heat carrier mounted within its water space substantially longitudinally and centrally thereof, a feed water preheating and purifying apparatus mounted within the steam space of the drum and comprising a longitudinally disposed flow member presenting a composite flow surface inclined in cross-section from a longitudinal line of highest elevation near the top of the drum and adjacent the vertical median plane of the water body to a longitudinal line of lowest elevation at a side wall of the drum adjacent the water surface, said flow member being constituted of a plurality of individual units arranged side by side longitudinally of the boiler drum each supported and arranged to present a portion of said flow surface having its lowest elevation at a side wall of the drum and each being readily and separately removable, and means for directing feed water substantially uniformly against the upper portion of said composite flow surface, whereby said feed water passes over said flow surface and is delivered to the water body along a line adjacent a side wall of the drum and removed from said heating element.

6. A feed water heating and purifying apparatus disposed within the steam space of a steam generating boiler drum, comprising a longitudinally disposed lower support secured to a side wall of the drum adjacent thereto and to the water surface, a second longitudinally disposed upper support secured adjacent the top wall of the drum near the vertical median plane of the water body, a plurality of individual units independently mounted side by side upon said supports and each presenting an upper flow surface inclining substantially from the upper to the lower support, said units presenting a composite flow surface parallel with respect to the longitudinal axis of the drum and inclined to the horizontal substantially in a plane passing through said supports, and means for directing feed water substantially uniformly against the upper portion of said composite flow surface to cause the same to flow thereover to the water body along a line adjacent said side wall of the drum.

7. A feed water heating and purifying apparatus disposed within the steam space of a steam generating boiler drum, comprising a lower supporting rod secured within the drum longitudinally thereof adjacent the intersection of the plane of the water level with a side wall, a second upper longitudinal supporting rod secured inside the drum adjacent the top thereof and the vertical median plane of the water body, a plurality of flow member units each comprising a frame having flow plates mounted thereon and having means at the upper and lower ends thereof for removably supporting the same from the aforementioned upper and lower supporting rods, said units being arranged side by side with their flow plates extending end to end longitudinally of the drum to present a composite flow surface inclined in cross-section substantially along a plane passing through said supporting rods, and means for directing feed water substantially uniformly against the upper plates of said units to cause the same to pass over the composite flow surface to the water body along a line adjacent said side wall of the drum.

8. A structure as claimed in claim 7 wherein the frame of each unit carries below its lowermost plate a collection gutter having an outlet opening.

9. A structure as claimed in claim 7 wherein the supporting means for the frame of each unit constitute hooks at the upper end and slotted arms at the lower end.

10. A structure as claimed in claim 7 wherein the flow plates of each unit are arranged in overlapping stepped relation at progressively increasing elevations thereby to present a composite stepped flow surface.

11. A structure as claimed in claim 7 wherein there is a substantially free path between the lower surfaces of the flow plates and the water surface.

12. In a steam generating boiler drum having an interior structure mounted within its water space substantially centrally thereof, a lower supporting rod extending longitudinally inside the steam space of the drum adjacent a side wall and the water surface, a second upper longitudinal supporting rod secured inside the drum adjacent the top thereof and the vertical median plane of the water body, a plurality of flow member units each comprising a frame having flow plates mounted thereon and having means at the upper and lower ends thereof for removably supporting the same from said supporting rods, said units being arranged side by side with their flow plates extending end to end longitudinally of the drum to present a composite flow surface inclined in cross-section substantially along a plane passing through said supporting rods, and means for directing feed water substantially uniformly against the upper plates of said units to cause the same to pass over the composite flow surface for delivery to the water body adjacent the side wall of the drum and removed from said interior structure.

13. A device as defined in claim 12 wherein each unit is provided with a collection gutter below the lower edge of its flow surface, said gutter having an outlet opening for directing the water from the flow surface to the main body of water in the drum at a point removed from the interior structure.

14. A structure as defined in claim 12 wherein the flow plates of each unit are arranged in overlapping stepped relation at progressively increasing elevations thereby to cause a dripping of the incoming feed water with subsequent discharge beyond a projection of the said interior structure.

15. In a steam generating boiler drum mounted with its longitudinal axis in a horizontal plane and having a heating element providing passage for a heat carrier mounted within its water space substantially longitudinally and centrally thereof, the coils of said heating element presenting an upper substantially horizontal surface adjacent the water level, a lower supporting rod secured within the drum extending longitudinally thereof adjacent a side wall at the water level, a second upper longitudinal supporting rod secured inside the drum adjacent the top thereof and the vertical median plane of the water body, a plurality of frames each having a pair of slotted arms engaging the lower supporting rod at its lower end and a pair of hooks engaging the upper supporting rod at its upper end, a plurality of flow plates mounted on each of said frames in overlapping relation at progressively increasing elevations to form a plurality of stepped surfaces extending between the supporting rods, a collection gutter mounted on each frame below the lowest flow plate and provided with an outlet opening leading to the water space beyond the heating element, each frame with its flow plates, gutter, hooks, and slotted arms constituting a unit, said units being arranged side by side whereby the upper surfaces of their flow plates present a composite flow surface having a number of steps equivalent to the number of flow plates of each unit, and a feed water conduit having discharge openings directed towards the upper surfaces of the upper flow plates of said units, the lower surfaces of the flow plates of said units being substantially freely exposed to the steam issuing from the water space.

In testimony whereof, we have hereunto set our signatures.

OTTO H. HARTMANN.
HANS TREDE.